(12) United States Patent
Quevedo et al.

(10) Patent No.: US 9,705,420 B2
(45) Date of Patent: Jul. 11, 2017

(54) MODEL PREDICTIVE CONTROL WITH REFERENCE TRACKING

(71) Applicant: ABB Technology AG, Zurich (CH)

(72) Inventors: Daniel Quevedo, New South Wales (AU); Tobias Geyer, Zurich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/694,368

(22) Filed: Apr. 23, 2015

(65) Prior Publication Data

US 2015/0229233 A1 Aug. 13, 2015

Related U.S. Application Data

(63) Continuation of application No. PCT/EP2013/072146, filed on Oct. 23, 2013.

(30) Foreign Application Priority Data

Oct. 23, 2012 (EP) ..................................... 12189564

(51) Int. Cl.
 *H02P 23/00* (2016.01)
 *H02P 21/00* (2016.01)
 (Continued)

(52) U.S. Cl.
 CPC ........... *H02M 7/483* (2013.01); *H02M 7/487* (2013.01); *H02P 21/0017* (2013.01);
 (Continued)

(58) Field of Classification Search
 CPC .......... H02P 23/30; H02P 21/13; H02P 27/14; H02P 21/12; H02P 21/30; H02P 23/0004;
 (Continued)

(56) References Cited

U.S. PATENT DOCUMENTS

| | | | | |
|---|---|---|---|---|
| 5,481,448 A | * | 1/1996 | Nakata | H02M 7/487 363/137 |
| 5,481,649 A | * | 1/1996 | Birdwell | G05B 13/028 700/49 |

(Continued)

OTHER PUBLICATIONS

Notification Concerning Transmittal of International Preliminary Report on Patentability and the Written Opinion of the International Searching Authority (Forms PCT/IB/326, PCT/IB373 and PCT/ISA/237) issued on May 7, 2015, by the International Bureau of WIPO in corresponding International Application No. PCT/EP2013/072146. (7 pages).

(Continued)

*Primary Examiner* — Paul Ip
(74) *Attorney, Agent, or Firm* — Taft Stettinius & Hollister LLP

(57) ABSTRACT

An exemplary electrical converter includes a plurality of semiconductor switches. The electrical converter is configured for generating a two-level or multi-level output voltage from an input voltage by switching the plurality of semiconductor switches. A method for controlling the electrical converter includes receiving a reference electrical quantity ($i_s^*$) and an actual electrical quantity ($i_s$), determining a sequence of future electrical quantities of the electrical converter from the actual electrical quantity, determining a maximal cost value based on the sequence of future electrical quantities, and iteratively determining an optimal switching sequence for the electrical converter. A switching sequence includes a sequence of future switching states for the semiconductor switches of the electrical converter. The method also includes selecting the first switching state of the optimal switching sequence as the next switching state (u) to be applied to the semiconductor switches of the electrical converter.

7 Claims, 3 Drawing Sheets

(51) Int. Cl.
*H02M 7/483* (2007.01)
*H02P 27/12* (2006.01)
*H02P 27/14* (2006.01)
*H02M 7/487* (2007.01)

(52) U.S. Cl.
CPC .............. *H02P 23/00* (2013.01); *H02P 27/12* (2013.01); *H02P 27/14* (2013.01)

(58) Field of Classification Search
CPC ........ H02P 27/12; H02M 7/487; G05B 13/04; G05B 13/048; G05B 13/028; F02D 2041/1433; F02D 41/0007; F02D 41/005
USPC ..... 318/400.02, 400.04, 400.13, 400.15, 812
See application file for complete search history.

(56) References Cited

U.S. PATENT DOCUMENTS

| | | | | |
|---|---|---|---|---|
| 5,519,605 | A * | 5/1996 | Cawlfield | G05B 13/048 700/31 |
| 6,785,630 | B2 * | 8/2004 | Kolk | G05D 23/1923 236/51 |
| 7,016,779 | B2 * | 3/2006 | Bowyer | F02D 41/0007 701/108 |
| 7,256,561 | B2 * | 8/2007 | Geyer | H02P 23/30 318/400.15 |
| 7,659,685 | B2 * | 2/2010 | Cesario | H02P 21/13 318/568.13 |
| 2003/0149539 | A1 * | 8/2003 | Kolk | G05D 23/1923 702/130 |
| 2005/0131620 | A1 * | 6/2005 | Bowyer | F02D 41/0007 701/108 |
| 2006/0125435 | A1 * | 6/2006 | Geyer | H02P 23/30 318/400.02 |
| 2009/0033259 | A1 * | 2/2009 | Cesario | H02P 21/13 318/400.04 |
| 2009/0066276 | A1 * | 3/2009 | Kley | H02P 21/12 318/400.15 |
| 2010/0253269 | A1 * | 10/2010 | Papafotiou | H02P 23/30 318/400.26 |
| 2011/0181225 | A1 * | 7/2011 | Geyer | H02M 7/487 318/503 |
| 2012/0242295 | A1 * | 9/2012 | Bech | F03D 9/003 322/87 |
| 2013/0016549 | A1 * | 1/2013 | Kieferndorf | H02M 7/487 363/131 |
| 2013/0238144 | A1 * | 9/2013 | Shahapurkar | F24F 11/0009 700/278 |

OTHER PUBLICATIONS

International Search Report (PCT/ISA/210) mailed on Mar. 21, 2014, by the European Patent Office as the International Searching Authority for International Application No. PCT/EP2013/072146.
Written Opinion (PCT/ISA/237) mailed on Mar. 21, 2014, by the European Patent Office as the International Searching Authority for International Application No. PCT/EP2013/072146.
European Search Report mailed on Mar. 27, 2013 for European Application No. 12189564.3.

* cited by examiner

MODEL PREDICTIVE CONTROL WITH REFERENCE TRACKING

RELATED APPLICATION(S)

This application claims priority as a continuation application under 35 U.S.C. §120 to PCT/EP2013/072146, which was filed as an International application on Oct. 23, 2013 designating the U.S., and which claims priority to European Application 12189564.3 filed in Europe on Oct. 23, 2012. The entire contents of these applications are hereby incorporated by reference.

FIELD

The present disclosure relates to the field of power converters, and particularly to a method and a controller for controlling an electrical converter, an electrical converter, and an electrical system comprising an electrical converter.

BACKGROUND INFORMATION

Electrical power converters are used in a wide range of applications, including variable speed drives, grid-connected power converters, and DC-to-DC converters. There are several methods for controlling electrical converters. One such method is current control with reference tracking for switching power converters, in which a controller aims at regulating the converter currents along given current reference trajectories.

Efficiency is a key aspect in power electronics and electrical drive systems. To reduce losses, semiconductor switches are used and the power converter control variables may be discrete-valued. However, this may increase the complexity of these systems and may make the control of switching power converters inherently difficult. Evaluating the effect of the switching policies on variables of interest, such as currents and torque, may become highly non-trivial.

Known control methods for power converters include PI-controllers with pulse width modulation, hysteresis-based methods, and various sampled-data control algorithms in which the impact of the manipulated variable at the next sampling instant is examined. The latter approaches include, for example, deadbeat control and direct torque control.

Another strategy is Model Predictive Control (MPC), which has had a major impact on industrial process control and has also found its way into the control of switching power converters. MPC may be used in a variety of topologies and operating conditions, its flexibility stemming from the on-line optimization of a suitable cost function. Direct MPC (also called Finite-set MPC) methods may tackle the current control and modulation problem in one computational stage. During transients, MPC achieves a very high dynamic performance, similar to the one of dead-beat control. The transient performance of MPC may be by far superior to the one which can be achieved with optimized pulse patterns (OPPs), since traditionally, it has only been possible to use OPPs in a modulator driven by a very slow control loop.

Usually, an MPC formulation may give a better performance if longer prediction horizons are used. Unfortunately, direct MPC with long horizons for control of power converters may be computationally challenging, or even infeasible, since the number of possible switching sequences grows exponentially as the horizon length is increased. Thus, enumeration may be applicable only to MPC problems featuring a small number of switching sequences. Exhaustive enumeration may not be practical for problems with thousands of sequences, which may arise from direct MPC with prediction horizons of four or more. For example, for a prediction horizon of length five, assuming a three-level converter, the number of switching sequences may amount to $1.4*10^7$.

SUMMARY

An exemplary method for controlling an electrical converter is disclosed, the electrical converter including a plurality of semiconductor switches, wherein the electrical converter is configured for generating a two-level or multi-level output voltage from an input voltage by switching the plurality of semiconductor switches, the method comprising: receiving a reference electrical quantity ($i_S^*$) and an actual electrical quantity ($i_S$); determining a sequence of future electrical quantities of the electrical converter from the actual electrical quantity; determining a maximal cost value based on the sequence of future electrical quantities; iteratively determining an optimal switching sequence for the electrical converter, wherein a switching sequence includes a sequence of future switching states for the semiconductor switches of the electrical converter; and selecting the first switching state of the optimal switching sequence as a next switching state (u) to be applied to the semiconductor switches of the electrical converter, wherein the optimal switching sequence is iteratively determined by: extending a switching sequence by appending a possible switching state to the switching sequence; determining a cost value for the extended switching sequence with a cost function based on the sequence of future electrical quantities; and discarding the extended switching sequence, when the cost value is higher than the maximal cost value.

BRIEF DESCRIPTION

The subject matter of the present disclosure will be explained in more detail in the following text with reference to exemplary embodiments which are illustrated in the attached drawings.

FIG. 1 schematically shows a converter according to an exemplary embodiment of the present disclosure;

FIG. 2 schematically shows an electrical system according to an exemplary embodiment of the present disclosure;

In principle, identical parts are provided with the same reference symbols in the figures.

DETAILED DESCRIPTION

Figure 1:
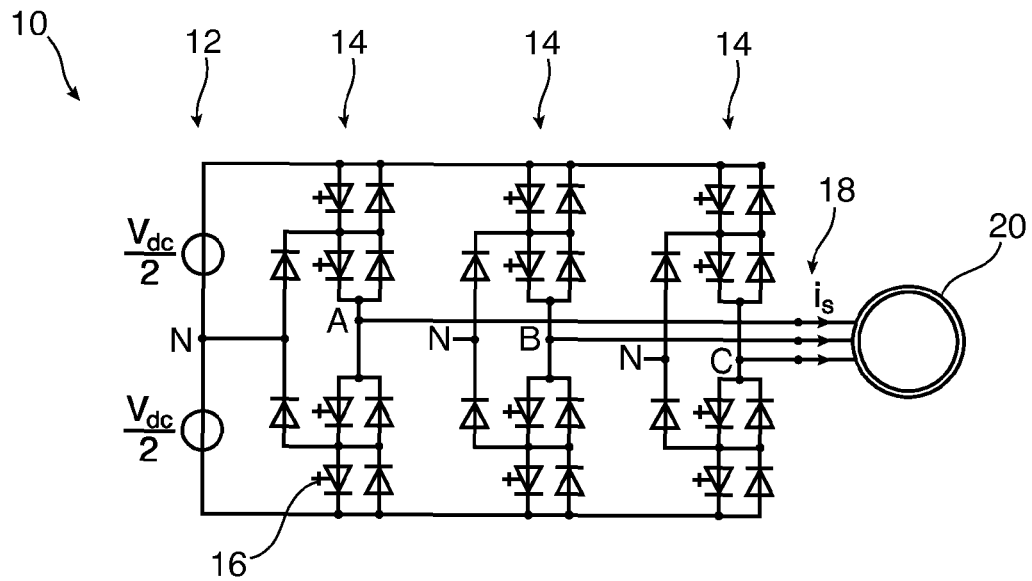

Exemplary embodiments of the present disclosure reduce switching costs of an electrical converter to enhance the efficiency of an electrical converter, and to achieve very fast dynamic responses during transients.

An exemplary embodiment of the present disclosure relates to a method for controlling an electrical converter. For example, the method, which may be an algorithm completely implemented in a controller, may be adapted (e.g., configured) for controlling a system having the electrical converter supplying an electrical machine (such as an induction motor), while the machine is running at a variable speed.

The electrical converter may include a plurality of semiconductor switches, wherein the electrical converter is configured for generating a multi-level output voltage from an input voltage by switching the plurality of semiconductor switches.

The exemplary method may be directly applicable to both the machine-side converter in an AC drive setting, as well as to a grid-side converter. The method is applicable to a number of converter topologies, like DC-to-AC converters, AC-to-DC converters, indirect AC-to-AC converters with a DC link, and to direct AC-to-AC converters.

An exemplary electrical converter of the present disclosure may be a two-level or a multi-level converter (e.g., a converter with at least two output levels), and the method may be used for such converters with very high numbers of voltage levels. An example for an electrical converter with more than two output levels may be an M2LC (modular multi-level) converter.

For example, the electrical converter may be a three-level neutral point clamped voltage source converter.

According to an exemplary embodiment of the present disclosure, the method includes the steps of: receiving a reference electrical quantity and an actual electrical quantity; determining a sequence of future electrical quantities of the electrical converter from the actual electrical quantity; determining a maximal cost value based on the sequence of future electrical quantities; iteratively determining an optimal switching sequence for the electrical converter, wherein a switching sequence includes a sequence of future switching states for the semiconductor switches of the electrical converter; and selecting the first switching state of the optimal switching sequence as the next switching state to be applied to the semiconductor switches of the electrical converter.

The control arrangement of the electrical converter can be adapted (e.g., configured) for performing a prediction of an optimal next switching state with the aid of a moving horizon in which future switching states are calculated from actual quantities. For example, the horizon may have two, three or more time steps.

The reference and/or actual electrical quantity may include at least one of a reference and/or actual current, a reference and/or an actual flux, a reference and/or an actual voltage, a reference and/or an actual torque, a reference and/or an actual power, and a reference and/or an actual speed. All these quantities (which in the case of a multi-phase converter may be vectors) may be determined from measuring currents and/or voltages and/or a torque in the electrical converter and/or a machine and/or a filter interconnected with the electrical converter. For example, the output current of the converter may be measured and the flux and/or the power or speed may be calculated from the current.

A future electrical quantity may include at least one of a future current, a future voltage, a future torque, and a future flux of an electrical machine connected to the electrical converter. These quantities may be predicted from a model of the electrical converter and/or the machine connected to the converter (or an electrical system including the electrical converter and further components like a filter, a transformer etc.).

Similarly, a future electrical quantity may include at least one of a future current, a future voltage, a future (virtual) flux of an electrical component connected to the electrical converter, such as an electrical filter or a transformer. These quantities may be predicted from a model of the electrical converter and/or the electrical component connected to the converter.

The optimal switching sequence is iteratively determined by: extending a switching sequence by appending a possible switching state to the switching sequence; determining a cost value for the extended switching sequence with a cost function based on the sequence of future electrical quantities; and discarding the extended switching sequence, when the cost value is higher than the maximal cost value. In other words, all switching sequences predicted by the controller may be generated by iteratively extending already calculated (shorter) switching sequences which have been rated as possible candidate sequences. Every time a switching sequence is extended, the method tests whether the cost value of the extended sequence is smaller than the cost value, which may be an incumbent optimum (that is recalculated during the iterations). If this is not the case, the extended sequence is discarded.

The test for a sequence to be a candidate sequence may be seen as based on sphere decoding. With sphere decoding, candidate sequences are iteratively considered which are within a sphere with a given radius which is centered at the unconstrained optimum.

As will be explained later, due to the specific structure of the direct MPC optimization problem, finding candidate sequences may be done very effectively. For example, the solution may be found by proceeding in a sequential manner, in a sense that at each step only a one-dimension problem should be solved. This may lead to very fast solutions making it possible to use direct MPC with longer prediction horizons. In such a way, simpler controllers with simpler processors may be used.

Since sphere decoding may allow solving the MPC problem with long prediction horizons, this may yield low current total harmonic distortions (THD) per switching frequency. As tests have shown, the current THD for a given switching frequency may be similar to the one achieved with optimized pulse patterns. At the same time, however, the transient response time may be very fast, resembling the one of deadbeat control and direct torque control.

The tests also show that using prediction horizons larger than one may provide significant performance benefits. At steady-state operation the current distortions and/or the switching frequency may be reduced considerably with respect to a horizon one direct MPC.

Due to the form of the MPC problem, the cost function may be formulated in a very beneficial way.

According to an exemplary embodiment of the present disclosure, the cost function is based on a norm of a matrix equation (or the square of the norm) with a triangular matrix, which is multiplied with the extended switching sequence. In such a way, it is possible to sequentially solve the MPC problem by starting with the line of the matrix having only one row, which solves one variable, and to solve one further variable with every further line.

According to another exemplary embodiment of the present disclosure, the triangular matrix is computed offline and depends only on the topology of the electrical converter. Since the triangular matrix may only depend on the topology of the converter (for example, the number of phases, structure of phases, dc-link voltage etc.), it is possible to calculate the triangular matrix before the iterations (in an extreme case outside of the controller) and to store the triangular matrix in the controller.

According to yet another exemplary embodiment of the present disclosure, the cost function is based on a difference between an unconstrained solution and the triangular matrix multiplied with the extended switching sequence. The unconstrained solution may be determined from the future electrical quantities before iteratively determining an optimal switching sequence.

It should be understood that there are constraints on the switching states and the switching sequences. For example, the switching states may be integer valued (since a switch may only have the states on and off). Furthermore, it may not be possible that a switching state changes between two consecutive time steps by more than one.

Without these constraints, the MPC problem may be solved rather easily, which results in an unconstrained solution (which may be floating point valued). The unconstrained solution may be used as a starting point for determining the exact optimal (constrained) solution. It may be assumed that the optimal solution is within a sphere of a given radius around the unconstrained solution.

According to another exemplary embodiment of the present disclosure, the maximal cost value is determined with the cost function applied to a guessed switching sequence based on an optimal switching sequence determined at a previous time step. The algorithm may be further sped up by making a first guess for a solution. Since at the previous time step, with the moving horizon an optimal sequence has been determined that reaches nearly (up to one time step) the horizon of the current step, and since one may assume that the actual quantities of the electrical converter (such as actual currents) only have changed by a small amount, the first guess may be based on the optimal switching sequence of the previous time step.

According to an exemplary embodiment of the present disclosure, for extending a switching sequence, only switching states are appended that result in extended switching sequences in which a phase voltage is switched only by one step up or down. Also by extending the switching sequences, only switching sequences that obey the constraints may be chosen.

According to an exemplary embodiment disclosed herein, the iteration is executed at each time step. The controller may have a fixed internal time step length (or sampling interval), and the method may be executed at every time step (e.g., the prediction of the future quantities, the iterations and the selection of the optimal sequence). The sequences of future electrical quantities may start at an actual time step and may be determined up to a horizon of time steps. The sequences of future electrical quantities may be based on the actual quantities determined and/or measured for the actual time step.

Also the sequence of future switching states (which is iteratively determined) may start from the actual time step and may be determined for up to the number of time steps of the prediction horizon.

Still another exemplary embodiment of the present disclosure relates to a controller for controlling an electrical converter. For example, the controller may be a part of the control arrangement of the electrical converter. The controller may be adapted for executing the method as explained in the above and in the following. It may be possible that the method is at least in part implemented in hardware on a FPGA, which is part of the controller. However, it may also be possible that the method is implemented in hardware and is executed on a processor, which is part of the controller.

An exemplary embodiment of the present disclosure relates to an electrical converter as described in the above and in the following. The electrical converter may include a controller as described in the above and in the following.

An exemplary electrical system of the present disclosure comprises such an electrical converter and an electrical load, for example an electrical motor, which is supplied by the electrical converter. Alternatively or additionally, the load may be any kind of rotating electrical machine and/or an electrical grid that is connected to a further electrical grid via the electrical converter. Moreover, the electrical system may include an electrical converter and any combination of a filter, transformer, load, grid and machine.

It has to be understood that features of the method as described in the above and in the following may be features of the controller, the electrical converter and the electrical system as described in the above and in the following, and vice versa.

Summarized, the method or an algorithm based on the method may have the following benefits, which have been determined with a test implementation:

A direct MPC with long horizons may be efficiently implemented: For example, when implementing the algorithm to solve direct MPC with horizon 10, on average less than 9 sequences should be evaluated, with the maximum number of sequences being 220. For comparison, when trying to implement direct MPC with horizon 5 with direct enumeration, on average more than 450,000 sequences should be examined. For larger horizons direct enumeration may become infeasible on standard computer platforms.

A further benefit may be a performance gain: Direct MPC with long prediction horizons implemented with the algorithm may give improved trade-offs between current THD and average switching frequency. At steady state operation, MPC with horizon 10 reduces the current THD by more than 15%, when compared to direct MPC with horizon one (and also with space vector modulation). With horizon 10, the performance of direct MPC becomes akin to that of optimized pulse patterns. In transient operation, MPC provides additional performance gains, namely very fast transient response times similar to deadbeat and direct torque control.

Furthermore, there are many possible application areas: Results suggest that the computation time is effectively independent of the number of levels of the converter. The algorithm may be suitable for multi-level converter topologies with a very large number of levels. Moreover, any load and converter with linear (internal) dynamics may be directly addressed, making this method suitable for higher-order systems, such as loads with LCL filters or modular converter topologies.

These and other aspects of the exemplary embodiments will be apparent from and elucidated with reference to the embodiments described hereinafter.

FIG. 1 schematically shows a converter according to an exemplary embodiment of the present disclosure. As shown in FIG. 1, a converter 10 includes a DC link 12 and three phase legs 14. Each phase leg 14 has a number of semiconductor switches 16 which may be switched in such a way that a multi-level output voltage (in the shown case a three-level output voltage) may be generated at each phase output 18 of the converter 10.

The outputs 18 are connected to an electrical machine 20, for example an induction motor.

The converter of FIG. 1 is a three-level neutral point clamped (NPC) voltage source converter (VSI) driving an induction machine 20, as depicted in FIG. 1. The total DC-link voltage $V_{dc}$ is assumed to be constant and the neutral point potential N is assumed to be fixed.

While the control method may be applied to a variety of power electronic systems, the following description is focused on the above setup. As an alternative, the method may be used for controlling an M2LC converter, which, in a branch, has a plurality of converter cells connected in series. Such converter cells may include a capacitor and at least two semiconductor switches for connecting/disconnecting the capacitor to the branch.

Figure 2:
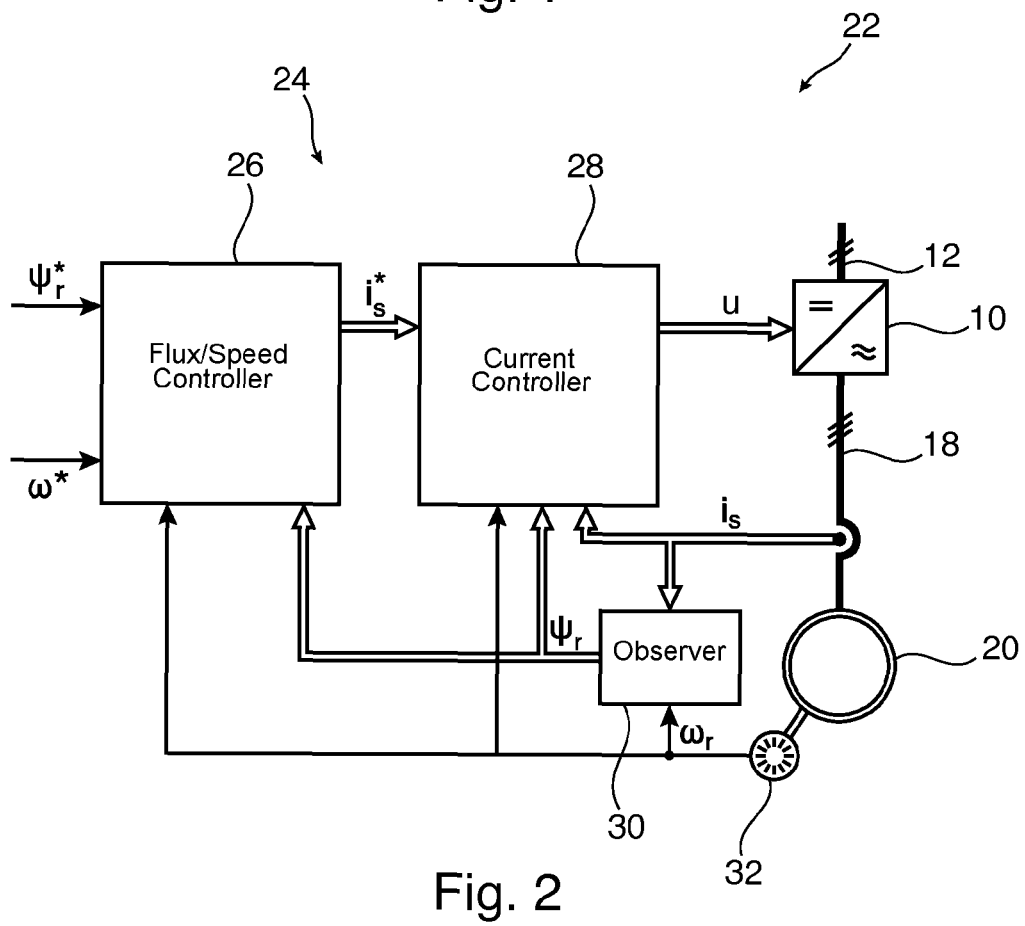

FIG. 2 schematically shows an electrical system according to an exemplary embodiment of the present disclosure. As shown in FIG. 2, an electrical system 22 includes the converter 10. The converter 10 includes furthermore a control arrangement 24 with a flux/speed controller 26, a current controller 28, and an observer 30.

The control arrangement 24 receives a reference flux $\psi_r^*$ and a reference speed $\omega^*$ and, at each time step, outputs a switching state u that is applied to the semiconductor switches 16 of the converter 10.

An optional encoder 32 measures an actual speed $\omega_r$ which is supplied to the flux/speed controller 26 and the observer 30. The observer 30 determines an actual flux $\psi_r$ from the actual speed $\omega_r$ and an actual current (vector) $i_S$ that is measured in the output of the converter 10.

Also the actual flux $\psi_r$ is supplied to the flux/speed controller 26 which determines a reference current (vector) $i_S^*$ that is received by the current controller 28.

The switch controller 28 may also receive the actual speed $\omega_r$, actual current (vector) $i_S$ and/or the actual flux $\psi_r$ and determines therefrom the switching state u, as will be explained in the following.

Figure 3:
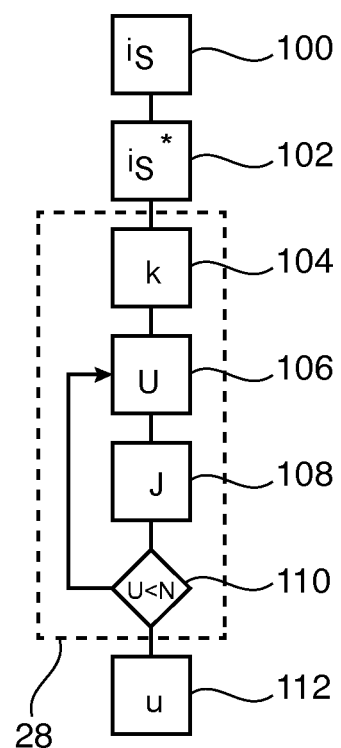
FIG. 3 shows a method for controlling a converter according to an exemplary embodiment of the present disclosure.

FIG. 3 shows a method for controlling a converter according to an exemplary embodiment of the present disclosure. The method may be executed in a control arrangement 24 as shown in FIG. 2. All the steps shown in FIG. 3 may be executed during one time step of the control arrangement 24.

In step 100, the actual current $i_S$ is measured by a current sensor in the output lines of the converter 10, and from the actual current $i_S$, the actual flux $\psi_r$ and the actual speed $\omega_r$ are determined.

In step 102, the controller 26 determines in an outer control loop the reference current $i_S^*$ from the signals determined and/or measured in step 100. The reference current $i_S^*$ is supplied to the controller 28.

As indicated in FIG. 3, the steps 104 to 110 are performed by the current controller 28, which provides an inner control loop/algorithm and solves the MPC problem. The steps 104 to 110 will be explained below in more detail.

Summarized, in step 104 to 110, the current controller 28 receives the reference current $i_S^*$ and determines an optimal switching state u.

In step 112, the optimal switching state for the actual time step is applied to the switches 16 of the converter 10, and the method starts again at step 100.

In the following normalized quantities will be used. Extending this to the time scale t, one time unit corresponds to $1/\omega_b$ seconds, where $\omega_b$ is the base angular velocity. Additionally, $\xi(t)$, $t \in R$ is used, to denote continuous-time variables, and $\xi(k)$, $k \in N$, to denote discrete-time variables with sampling interval $T_s$.

The $\alpha\beta$ Reference Frame: All variables $\xi_{abc} = [\xi_a \ \xi_b \ \xi_c]^T$ in the three-phase system (abc) are transformed to $\xi_{\alpha\beta} = [\xi_\alpha \ \xi_\beta]^T$ in the stationary orthogonal $\alpha\beta$ coordinates through $\xi_{\alpha\beta} = P\xi_{abc}$ where $$P = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}. \quad (1)$$

Vector Norms: The 1-norm of a vector $\xi \in R^n$ is defined as $\|\xi\|_1 \triangleq \sum_{i=1}^n |\xi_i|$, where $\xi_i$ denotes the ith element of $\xi$. The squared Euclidean norm of $\xi$ is defined as $\|\xi\|_2^2 \triangleq \xi^T\xi = \sum_{i=1}^n \xi_i^2$, and the squared norm weighted with the positive definite matrix Q is given by $\|\xi\|_Q^2 \triangleq \xi^T Q\xi$. The infinity norm of $\xi$ is defined as $\|\xi\|_\infty \triangleq \max_i |\xi_i|$.

Electrical System

Let the integer variables $u_a$, $u_b$, $u_c \in u$ denote the switch positions in the three phase legs 14, where for a three-level converter the constraint set is given by $$u \triangleq \{-1, 0, 1\}. \quad (2)$$

In each phase, the values −1, 0, 1 correspond to the phase voltages $$-\frac{V_{dc}}{2}, 0, \frac{V_{dc}}{2},$$

respectively. Thus, the voltage applied to the terminals of the load 20 in orthogonal coordinates is $$v_{s,\alpha\beta} = \frac{1}{2}V_{dc}u_{\alpha\beta} = \frac{1}{2}V_{dc}Pu \quad (3)$$

with the switching state u defined by $u \triangleq [u_a \ u_b \ u_c]^T$.

The state-space model of a squirrel-cage induction machine 20 in the stationary $\alpha\beta$ reference frame is summarized hereafter. For the current control problem at hand, the stator currents $i_{s\alpha}$ and $i_{s\beta}$ can be selected as state variables. The state vector is complemented by the rotor flux linkages $\psi_{r\alpha}$ and $\psi_{s\beta}$, and the rotor's angular velocity $\omega_r$. The model inputs are the stator voltages $v_{s\alpha}$ and $v_{s\beta}$. The model parameters are the stator and rotor resistances $R_s$ and $R_r$, the stator, rotor and mutual reactances $X_{ls}$, $X_{lr}$ and $X_m$, respectively, the inertia J, and the mechanical load torque $T_l$. All rotor quantities are referred to the stator circuit. In terms of the above quantities, the continuous-time state equations are $$\frac{di_s}{dt} = -\frac{1}{\tau_s}i_s + \left(\frac{1}{\tau_r} - \omega_r\begin{bmatrix} 0 & -1 \\ 1 & 0 \end{bmatrix}\right)\frac{X_m}{D}\psi_r + \frac{X_r}{D}v_s \quad (4a)$$

$$\frac{di_s}{dt} = -\frac{1}{\tau_s}i_s + \left(\frac{1}{\tau_r} - \omega_r\begin{bmatrix} 0 & -1 \\ 1 & 0 \end{bmatrix}\right)\frac{X_m}{D}\psi_r + \frac{X_r}{D}v_s \quad (4a)$$

$$\frac{d\psi_r}{dt} = \frac{X_m}{\tau_r}i_s - \frac{1}{\tau_r}\psi_r + \omega_r\begin{bmatrix} 0 & -1 \\ 1 & 0 \end{bmatrix}\psi_r \quad (4b)$$

$$\frac{d\omega_r}{dt} = \frac{1}{J}(T_e - T_\ell), \quad (4c)$$

where $$X_s \triangleq X_{ls} + X_m, \ X_r \triangleq X_{lr} + X_m, \ D \triangleq X_s X_r - X_m^2 \quad (5)$$

(To simplify the notation, in (4) αβ has been dropped from the vectors $i_s$, $\psi_r$ and $v_s$.) The transient stator time constant and the rotor time constant are equal to $$\tau_s \triangleq \frac{X_r D}{R_s X_r^2 + R_r X_m^2} \text{ and } \tau_r \triangleq \frac{X_r}{R_r}, \quad (6)$$

whereas the electromagnetic torque is given by $$T_e = \frac{X_m}{X_r}(\psi_{r\alpha} i_{s\beta} - \psi_{r\beta} i_{s\alpha}). \quad (7)$$

Model Predictive Current Control

The control problem is formulated in the αβ reference frame. Let $i_s^*$ denote the reference of the instantaneous stator current, with $i_s^* = [i^*_{s\alpha} i^*_{s\beta}]^T$. The objective of the current controller 28 is to manipulate the three-phase switch position u, by synthesizing a switching sequence, such that the stator current $i_s$ closely tracks its reference. At the same time, the switching effort, e.g., the switching frequency or the switching losses, are to be kept small. To avoid a shoot-through, direct switching between 1 and −1 in a phase leg 14 is prohibited.

The predictive current controller 28 relies on an internal model of the physical electrical system 22 to predict future stator current trajectories. The rotor speed $\omega_r$ is assumed to be constant within the prediction horizon, which turns the speed into a time-varying parameter. In the case, the prediction horizon being less than one ms, this appears to be a mild assumption.

For the subsequent analysis, the electrical system 22 can be described through the following state vector of the drive model:

$$x \triangleq [i_{s\alpha} \ i_{s\beta} \ \psi_{r\alpha} \ \psi_{r\beta}]^T. \quad (8)$$

The stator current is taken as the system output vector, e.g., $y = i_s$, whereas the switch position $u_{\alpha\beta}$ in the orthogonal coordinate system constitutes the input vector, and is provided by the controller.

In terms of x, the continuous-time prediction model given in (4a) to (4c) becomes $$\frac{dx(t)}{dt} = Fx(t) + Gu_{\alpha\beta}(t) \quad (9a)$$

$$y(t) = Cx(t), \quad (9b)$$

with matrices F, G and C.

By integrating (9a) from $t = kT_s$ to $t = (k+1)T_s$ and observing that during this time-interval $u_{\alpha\beta}(t)$ is constant and equal to $u_{\alpha\beta}(k)$, one obtains the discrete-time representation $$x(k+1) = Ax(k) + Bu_{\alpha\beta}(k) \quad (10a)$$

$$y(k) = Cx(k) \quad (10b)$$

where $$A \triangleq e^{FT_s} \text{ and } B \triangleq -F^{-1}(I-A)G. \quad (11)$$

If matrix exponentials were to pose computational difficulties, the forward Euler approximation is usually sufficiently accurate for short sampling intervals of up to several tens of μs. In this case, the discrete-time system matrices are given by $$A \triangleq I + FT_s, \ B \triangleq GT_s. \quad (12)$$

The control problem at time-step k of tracking the current reference over the prediction horizon N can be addressed through minimization of the cost function $$J = \sum_{\ell=k}^{k+N-1} \|i_{e,abc}(\ell+1)\|_2^2 + \lambda_u \|\Delta u(\ell)\|_2^2, \quad (13)$$

where the current error in abc-frame is defined as $$i_{e,abc} \triangleq i_{s,abc}^* - i_{s,abc} \quad (14)$$

and the switching effort is defined as $$\Delta u(k) \triangleq u(k) - u(k-1), \quad (15)$$

thereby referring to the switch positions in the three phases a, b, and c. The first term in (13) penalizes the predicted three-phase current error at the time-steps k+1, k+2, . . . k+N, using the squared Euclidean norm; the second term penalizes the switching effort at the time-steps k, k+1, . . . k+N−1. The parameter $\lambda_u \geq 0$ is a tuning parameter, which adjusts the trade-off between the tracking accuracy(deviation of the current from its reference) and the switching effort, namely whether switching is performed or not.

Since in (8), the stator currents are represented in αβ coordinates rather than in abc, the first term in (13) can be expressed in αβ coordinates, too. For that purpose, $$i_{e,\alpha\beta} \triangleq i^*_{s,\alpha\beta} - i_{s,\alpha\beta}$$

$$i_{e,abc} = P^{-1} i_{e,\alpha\beta},$$

with $$P^{-1} = \begin{bmatrix} 1 & 0 \\ -\frac{1}{2} & \frac{\sqrt{3}}{2} \\ -\frac{1}{2} & -\frac{\sqrt{3}}{2} \end{bmatrix}.$$

is defined.

Noting that $P^{-T} P^{-1} = 1.5 I$, the first term in (13) can thus be rewritten as $$\|i_{e,abc}\|_2^2 = (i_{e,abc})^T i_{e,abc} = 1.5 \|i_{e,\alpha\beta}\|_2^2. \quad (16)$$

Omitting the factor 1.5 to simplify the expression, the equivalent cost function with the current error formulated in orthogonal coordinates becomes $$J = \sum_{\ell=k}^{k+N-1} \|i_{e,\alpha\beta}(\ell+1)\|_2^2 + \lambda_u \|\Delta u(\ell)\|_2^2, \quad (17)$$

where $$\Delta u(l) = u(l) - u(l-1) \quad (18a)$$

$$i_{e,\alpha\beta}(l+1) = i_{s,\alpha\beta}^*(l+1) - Cx(l+1) \quad (18b)$$

$$x(l+1) = Ax(l) + BPu(l). \quad (18c)$$

The switching sequence U(k) is introduced $$U(k) = [u^T(k) \ldots u^T(k+N-1)]^T$$

which represents the sequence of switch positions, the controller 28 has to decide upon. The optimization problem underlying model predictive control with current reference tracking can then be stated as $$U_{opt}(k) = \underset{U(k)}{\arg\min} J \qquad (19)$$

subject to $$U(k) \in \mathbb{U} \qquad (20a)$$

$$\|\Delta u(l)\|_\infty \leq 1, \; \forall l=k,\ldots,k+N-1. \qquad (20b)$$

In (20a), U is the N-times Cartesian product of the set u:

$$\mathbb{U} = u \times \ldots \times u,$$

where u denotes the set of discrete three-phase switch positions, obtained from the single-phase constraints u via:

$$u = u \times u \times u, \qquad (21)$$

see (2). (20b) is referred to as switching constraints. The latter are imposed to avoid solutions leading to a shoot-through in the converter.

Following the moving horizon optimization principle, only the first element of the optimizing sequence $U_{opt}(k)$ is applied to the semiconductor switches at time-step k. At the next time-step, k+1, and given new information on x(k+1), another optimization is performed, providing the optimal switch positions at time k+1. The optimization is repeated on-line and ad infinitum.

Due to the discrete nature of the decision variable U(k), the optimization problem (19) is difficult to solve, except for short horizons. In fact, as the prediction horizon is enlarged and the number of decision variables is increased, the (worst-case) computational complexity grows exponentially, thus, cannot be bounded by a polynomial.

The difficulties associated with minimizing the cost function J become apparent when using exhaustive search. With this method, the set of admissible switching sequences U(k) is enumerated and the cost function evaluated for each such sequence. The switching sequence with the smallest cost is (by definition) the optimal one and its first element is chosen as the control input. At every time-step k, exhaustive search entails the following procedure:

1) Given the previously applied switch position u(k−1) and taking into account the constraints (20), determine the set of admissible switching sequences over the prediction horizon.
2) For each of these switching sequences, compute the state trajectory according to (18c) and the predicted evolution of the current error (18b).
3) For each switching sequence, compute the cost J according to (17).
4) Choose the switching sequence, $U_{opt}(k)$, which minimizes the cost. Apply its first element, $u_{opt}(k)$, to the converter.

At the next time-step, k+1, repeat the above procedure, using updated information on the current state vector, x(k+1) and reference trajectory $i^*_{s,\alpha\beta}(k+1), \ldots, i^*_{s,\alpha\beta}(k+N+1)$.

It is easy to see that exhaustive search is computationally feasible only for very small horizons N, such as one or two. For N=5, assuming a three-level converter and neglecting the switching constraint (20b), the number of switching sequences amounts to $1.4 \cdot 10^7$. This is clearly impractical, even when imposing (20b), which reduces the number of sequences by an order of magnitude.

Integer Quadratic Programming Formulation

In the following, the optimization problem (19) is formulated in vector form and stated as a truncated integer least squares problem.

By successively using (18c), the state vector at time-step l+1 can be represented as a function of the state vector at time-step k and the switching sequence U(k) as follows:

$$x(l+1) = Ax(k) + [A^{l-k}BP \ldots A^0 BP]U(k) \qquad (22)$$

with l=k, ..., k+N−1. Let Y(k) denote the output sequence over the prediction horizon from time-step k+1 to k+N, e.g., $Y(k) = [y^T(k+1), \ldots, y^T(k+N)]^T$ and $Y^*(k)$ correspondingly the reference. By inserting (22) in (10b) we obtain $$Y(k) = \Gamma x(k) + \Upsilon U(k), \qquad (23)$$

with matrices $\Gamma$ and $\Upsilon$.

The dynamical evolution of the prediction model, (18a)-(18c), can then be included in the cost function (17), yielding $$J = \|\Gamma x(k) + \Upsilon U(k) - Y^*(k)\|_2^2 + \lambda_u \|SU(k) - Eu(k-1)\|_2^2, \qquad (24)$$

where S and E are two further matrices. The cost depends upon the state vector x(k), the previously chosen switch position u(k−1) and the tentative switching sequence U(k). In (24), a sequence of state vectors is not specified—it was replaced by (22). As in (17), the first term in the cost function penalizes the predicted current tracking error, while the second term penalizes the switching effort.

The cost function in (24) can be written in compact form as per $$J = \theta(k) + 2(\Theta(k))^T U(k) + \|U(k)\|_Q^2 \qquad (25)$$

with $$\theta(k) = \|\Gamma x(k) - Y^*(k)\|_2^2 + \lambda_u \|Eu(k-1)\|_2^2 \qquad (26a)$$

$$\Theta(k) = ((\Gamma x(k) - Y^*(k))^T \Upsilon - \lambda_u (Eu(k-1))^T S)^T \qquad (26b)$$

$$Q = \Upsilon^T \Upsilon + S^T \lambda_u IS. \qquad (26c)$$

Note that Q is (by definition) symmetric and positive definite for $\lambda_u > 0$. Completing the squares shows that $$J = (U(k) + Q^{-1}\Theta(k))^T Q (U(k) + Q^{-1}\Theta(k)) + \text{const.} \qquad (27)$$

The unconstrained optimum of (19) is obtained by minimization without taking into account the constraints (20), thus, allowing $U(k) \in R^3 \times \ldots \times R^3$. Since Q is positive definite, it follows directly from (27) that the unconstrained solution at time-step k is given by $$U_{unc}(k) = -Q^{-1}\Theta(k). \qquad (28)$$

Since the first element of the unconstrained switching sequence $U_{unc}(k)$ does not meet the constraints (20), it cannot be directly used as gating signals to the semiconductor switches. However, $U_{unc}(k)$ can be used to state the solution to the constrained optimization problem (19)-(20), as shown next.

The cost function (27) can be rewritten by inserting (28) as follows:

$$J = (U(k) - U_{unc}(k))^T Q (U(k) - U_{uns}(k)) + \text{const.} \qquad (29)$$

Since Q is positive definite, there exists a unique invertible lower triangular matrix $H \in R^{3N \times 3N}$, which satisfies:

$$H^T H = Q. \qquad (30)$$

The triangular matrix H can be calculated by noting that its inverse, $H^{-1}$, is also lower triangular and is provided by the following Cholesky decomposition of $Q^{-1}$:

$$H^{-1} H^{-T} = Q^{-1}. \qquad (31)$$

In terms of H and $$\overline{U}_{unc}(k) \triangleq H U_{unc}(k), \qquad (32)$$

the cost function in (29) can be rewritten as $$J=(HU(k)-\overline{U}_{unc}(k))^T(HU(k)-\overline{U}_{uns}(k))+\text{const.} \quad (33)$$

and the optimization problem (19) amounts to finding $$U_{opt}(k) = \operatorname*{argmin}_{U(k)} \|\overline{U}_{unc}(k) - HU(k)\|_2^2 \quad (34)$$

subject to (20). Now, the MPC optimization problem has been rewritten as a (truncated) integer least-squares problem.

In the following, the focus is on the condition where the horizon is taken equal to one. The low dimensionality of the problem at hand also allows for an intuitively accessible visualization.

As an example, the case N=1 is evaluated below. With N=1, we have U(k)=u(k) and (25) reduces to $$J=\theta(k)+2(\Theta(k))^T u(k)+\|u(k)\|_Q^2 \quad (35)$$

with $$\theta(k)=\|CAx(k)-i^*_s(k)\|_2^2+\lambda_u\|u(k-1)\|_2^2 \quad (36a)$$

$$\Theta(k)=((CAx(k)-i^*_s(k))^T CBP-\lambda_u(u(k-1))^T)^T \quad (36b)$$

$$Q=(CBP)^T CBP+\lambda_u I. \quad (36c)$$

To further elucidate this case, the Euler approximation (12) can be used to obtain:

$$CBP = \frac{X_r V_{dc}}{3D} T_s \begin{bmatrix} 1 & -\frac{1}{2} & -\frac{1}{2} \\ 0 & \frac{\sqrt{3}}{2} & -\frac{\sqrt{3}}{2} \end{bmatrix}, \quad (37)$$

so that $$Q = \left(\frac{X_r V_{dc}}{3D}\right)^2 (T_s)^2 \begin{bmatrix} 1 & -\frac{1}{2} & -\frac{1}{2} \\ -\frac{1}{2} & 1 & -\frac{1}{2} \\ -\frac{1}{2} & -\frac{1}{2} & 1 \end{bmatrix} + \lambda_u \begin{bmatrix} 1 & 0 & 0 \\ 0 & 1 & 0 \\ 0 & 0 & 1 \end{bmatrix} \quad (38)$$

As in the N>1 case, Q is by definition symmetric and positive definite for $\lambda_u>0$. If the design parameter $\lambda_u$ is chosen to be much larger than $(X_r V_{dc}/3D)^{2T_s^2}$, then $Q \approx \lambda_u I$ and $H \approx \sqrt{\lambda_u} I$, see (30). On the other hand, if $\lambda_u>0$ is much smaller than $(X_r V_{dc}/3D)^{2T_s^2}$, then $$H \approx \frac{X_r V_{dc}}{3D} T_s \begin{bmatrix} 0 & 0 & 0 \\ -\frac{\sqrt{3}}{2} & \frac{\sqrt{3}}{2} & 0 \\ -\frac{1}{2} & -\frac{1}{2} & 1 \end{bmatrix} \quad (39)$$

For N=1, the integer least-squares problem formulation (34) becomes $$u_{opt}(k) = \operatorname*{argmin}_{u(k)} \|Hu(k) - \overline{u}_{unc}(k)\|_2^2 \quad (40a)$$

$$s \cdot t \cdot u(k) \in u \quad (40b)$$

$$\|\Delta u(k)\|_\infty \leq 1. \quad (40c)$$

where $$\overline{u}_{unc}(k)=-HQ^{-1}\Theta(k).$$

If $\lambda_u$ is increased, then the diagonal terms of Q in (38) become dominant and H resembles a diagonal matrix. As a result, for sufficiently large values of $\lambda_u$, direct componentwise rounding of $\overline{u}_{unc}(k)$ to the constraint set may often give the optimal solution.

Method for Calculating the Optimal Switch Positions

In the following, a sphere decoding algorithm/method is formulated to find the optimal switching sequence $U_{opt}(k)$. The algorithm is based on branch and bound techniques and is by far more efficient than the explicit enumeration method described above. For ease of notation, throughout this section, we will write U for a candidate sequence U(k).

The method is shown in steps 104 to 110 of FIG. 3 and may be performed by the controller 28 at each time-step k.

In step 104, the reference current $i_S^*$, the actual current $i_S$, the actual flux $\psi_r$ and the actual speed $\omega_r$ are received, and the algorithm is initialized for the actual time step.

The controller 28 first uses the current state x(k), the future reference values Y*(k), the previous switching state u(k−1), and the previous optimal switching sequence $U_{opt}$(k−1) to calculate the first guess $U_{sub}(k)$, the maximal cost value or sphere radius ρ(k) and the unconstrained solution $\overline{U}^{unc}(k)$; see (32), (28), and (26b) and (43), (44) below.

A set of candidate switching sequences is initialized with an empty sequence.

The following steps 106, 108 and 110 are performed iteratively over the set of candidate sequences.

In step 106, a candidate sequence U is selected from the set of candidate sequences, and extended with all possible switching states u of the converter 10.

Furthermore, the extended sequence U is tested, whether it obeys the switching constraints (20b).

In step 108, the result (e.g., the cost value) of the cost function J is calculated for the extended sequence U. The extended sequence is discarded, when the cost value of the cost function is bigger than the maximal cost value or sphere radius ρ(k).

In step 110, when the length of the extended sequence U is smaller than the horizon N, the extended sequence is put back in the set of candidate sequences.

Otherwise, when the length of the extended sequence U has reached the horizon length N, the first switching state u of the extended sequence U may be selected as the next optimal switching state u. It is also possible that all sequences with horizon N are gathered and the sequence with the smallest cost value is chosen to be the optimal sequence.

Candidate sequences U∈U are considered iteratively, which belong to a sphere of radius ρ(k)>0 centered at the unconstrained solution $\overline{U}_{unc}(k)$, $$\|\overline{U}_{unc}(k)-HU\|_2 \leq \rho(k), \quad (41)$$

and which satisfy the switching constraint (20b).

The radius ρ(k) may be seen as a maximal cost value ρ(k) and all cost values calculated with the cost function J for candidate sequences should be smaller and/or equal to the maximal cost value ρ(k).

In the case of multi-level converters (where U has many elements), the set of candidate sequences satisfying the above conditions can be much smaller than the original constraint set U. Computation times may be drastically reduced compared to exhaustive search.

A key property is that, since H is triangular, for a given radius ρ(k) or maximal cost value ρ(k), identifying candidate sequences U which satisfy (41) is very simple. For the present case, H is lower triangular, thus (41) can be rewritten as $$\rho^2(k) \geq (\overline{U}_1 - H_{(1,1)}U_1)^2 + (\overline{U}_2 - H_{(2,1)}U_1 - H_{(2,2)}U_2)^2 + \ldots \quad (42)$$

where $\overline{U}_i$ denotes the i-th element of $\overline{U}_{unc}(k)$, $U_i$ is the i-th element of U, and H(i,j) refers to the (i,j)-th entry of H. Therefore, the solution set of (41) can be found by proceeding in a sequential manner akin to that used in Gaussian elimination, in a sense that at each step only a one-dimension problem should be solved.

The algorithm specifies an initial value for the radius used at time k to determine U. On the one hand, the radius ρ(k) should be as small as possible, enabling us to remove as many candidate solutions a priori as possible. On the other hand, ρ(k) should not be too small, to ensure that the solution set is non-empty. The initial radius is chosen by using the following educated guess for the optimal solution:

$$U_{sub}(k) = \begin{bmatrix} 0 & I & 0 & \cdots & 0 \\ 0 & 0 & I & \ddots & \vdots \\ \vdots & & \ddots & \ddots & 0 \\ 0 & \cdots & \cdots & 0 & I \\ 0 & \cdots & \cdots & 0 & I \end{bmatrix} U_{opt}(k-1), \quad (43)$$

which is obtained by shifting the previous solution $U_{opt}(k-1)$ by one time step and repeating the last switch position. This is in accordance with the moving horizon optimization paradigm. Since the optimal solution at the previous time step satisfies both constraints (20a) and (20b), the shifted guess automatically meets these constraints, too. Thus, $U_{sub}(k)$ is a feasible solution candidate of (34). Given (43), the initial value of ρ(k) is then set to:

$$\rho(k) = \|\overline{U}_{unc}(k) - HU_{sub}(k)\|_2. \quad (44)$$

For example, the optimal switching sequence $U_{opt}(k)$ may be obtained by executing the following algorithm, which implements the above described method with an recursive function:

---
$U_{opt}(k) = \text{MSPHDEC}(\emptyset, 0, 1, \rho^2(k), \overline{U}_{unc}(k))$,     (45)
where ∅ is the empty set.
function $U_{opt} = \text{MSPHDEC}(U, d^2, i, \rho^2, (\overline{U}_{unc}))$
  for each u ∈ u do
    $U_i = u$
    $d'^2 = \|\overline{U}_i - H_{(i,1:i)}U_{1:i}\|_2^2 + d^2$
    if $d'^2 \leq \rho^2$ then
      if i < 3N then
        $\text{MSPHDEC}(U, d'^2, i + 1, \rho^2, \overline{U}_{unc})$
      else
        if U meets (20b) then
          $U_{opt} = U$
          $\rho^2 = d'^2$
        end if
      end if
    end if
  end for
end function

---

Starting with the first component, the switching sequence U is built component by component, by considering the admissible single-phase switch positions in the constraint set u. If the associated squared distance is smaller than the current value of $\rho^2$, then the algorithm proceeds to the next component. If the last component, e.g., $U_{3N}$, has been reached, meaning that U is of full dimension 3N, then U is a candidate solution. If U meets the switching constraint (20b) and if the distance is smaller than the current optimum, then the algorithm updates the incumbent optimal solution $U_{opt}$ and also the radius ρ.

The computational advantages of this algorithm stem from adopting the notion of branch and bound. Branching is done over the set of single-phase switch positions u; bounding is achieved by considering solutions only within the sphere of current radius. If the distance d' exceeds the radius, a certificate has been found that the branch (and all its associated switching sequences) provides only solutions worse than the incumbent optimum. Therefore, this branch can be pruned, e.g., removed from further consideration without exploring it. During the optimization procedure, whenever a better incumbent solution is found, the radius is reduced and the sphere thus tightened, so that the set of candidate sequences is as small as possible, but non-empty. The majority of the computational burden relates to the computation of d' via evaluating the terms $H_{(i,1:i)} U_{1:i}$. Thanks to (42), d' can be computed sequentially, by computing only the squared addition due to the ith component of U. The sum of squares in d, accumulated over the layers 1 to i−1, does not need to be recomputed.

Figure 4:
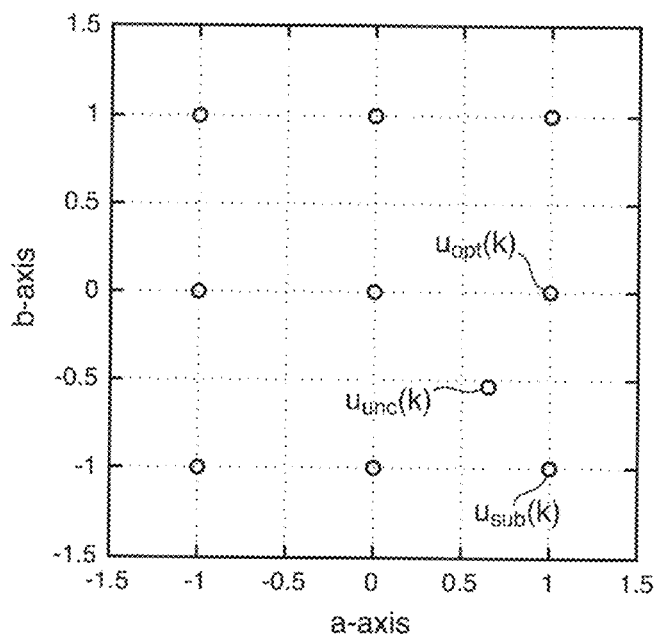
FIG. 4 shows a diagram with switching states according to an exemplary embodiment of the present disclosure.
Figure 5:
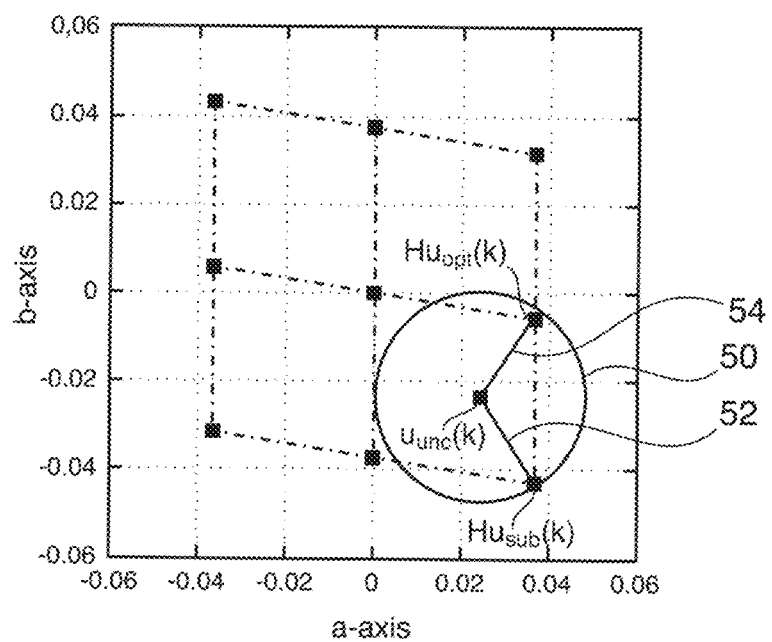
FIG. 5 shows a diagram with transformed switching states according to an exemplary embodiment of the present disclosure.

FIG. 4 shows a diagram with switching states according to an exemplary embodiment of the present disclosure and FIG. 5 shows a diagram with transformed switching states according to an exemplary embodiment of the present disclosure. Each of FIGS. 4 and 5 show diagrams with switching states for the case N=1 as an illustrative example.

The horizon N=1 case is considered with cost function parameters $T_s$=25 μs and $\lambda_u$=1·10$^{-3}$. Assuming a three-level converter 10 and the same parameters as above in equations (35) to (40), the set of single-phase switch positions is u={−1, 0, 1}. The set of admissible three-phase switch positions u(k)∈u is shown in FIG. 4 as black circles. To simplify the exposition, in FIG. 4 only the ab-plane is shown, neglecting the c-axis.

Suppose that $u_{opt}(k-1) = [1\ 0\ 1]^T$ and that the problem instance at time-step k gives the unconstrained solution $u_{unc}(k) = [0.647\ -0.533\ -0.114]^T$, shown as a further circle in FIG. 4. Rounding $u_{unc}(k)$ to the next integer values leads to the possible feasible solution $u_{sub}(k) = [1\ -1\ 0]^T$, which corresponds to the circle referenced with $u_{sub}(k)$. It turns out, however, that the optimal solution is $u_{opt}(k) = [1\ 0\ 0]^T$, indicated by the circle referenced with $u_{opt}(k)$.

The sphere decoding problem is solved in the transformed coordinate system, which is shown in FIG. 5. The transformed coordinate system is created by the generator matrix $$H = \begin{bmatrix} 36.45 & 0 & 0 \\ -6.068 & 36.95 & 0 \\ -5.265 & -5.265 & 37.32 \end{bmatrix} \cdot 10^{-3},$$

see (30). Using H, the integer solutions u∈u in the orthogonal coordinate system can be transformed to Hu, which are shown as black squares in FIG. 5 and connected by the dash-dotted lines. The coordinate system created by H is slightly skewed, but almost orthogonal, with the angle between the axes being 98.2° for the chosen parameters. As discussed above, increasing $\lambda_u$ results in this angle converging towards 90°.

The optimal solution $u_{opt}(k)$ is obtained by minimizing the distance between the unconstrained solution $\overline{u}_{unc}(k)$ and the sequence of integer switch positions in the transformed coordinate system. The initial value of the maximal cost value or sphere radius ρ(k) results from (44) and is equal to 0.638. This defines a ball of radius ρ(k) around $\bar{u}_{unc}(k)=Hu_{unc}(k)$, which is shown in FIG. 4(b) as the circle 50. This ball reduces the set of possible solutions from having $3^3=27$ elements to having only two values, since only two transformed integer solutions Hu(k) lie within the sphere, namely $Hu_{opt}(k)$ and $Hu_{sub}(k)$. The algorithm sequentially computes the distances between each of these two points and $\bar{u}_{unc}(k)$ with the cost function J. These distances are indicated by the lines (cost values) 52, 54, respectively. The line (cost value) 54 is slightly shorter than the line 52. Therefore, minimizing the distance yields the optimal solution $u_{opt}(k)=[1\ 0\ 0]^T$ and not the naively rounded switch position $u_{sub}(k)=[1-1\ 0]^T$.

According to exemplary embodiments of the present disclosure controller for controlling the electrical converter can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The general processor(s) can be configured to include and perform features of the exemplary embodiments of the present disclosure such as, a method for controlling an electrical converter. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. An electrical system, comprising:
an electrical converter comprising a plurality of semiconductor switches, wherein the electrical converter is adapted for generating a two-level or multi-level output voltage from an input voltage by switching the plurality of semiconductor switches, and a controller;
wherein the controller executes a method for controlling the electrical converter comprising:
receiving a reference electrical quantity ($i_s^*$) and an actual electrical quantity ($i_s$), the reference electrical quantity being determined from measured currents, voltages, torques, and/or speeds;
determining a sequence of future electrical quantities of the electrical converter from the actual electrical quantity;
determining a maximal cost value based on the sequence of future electrical quantities;
iteratively determining an optimal switching sequence for the electrical converter, wherein a switching sequence includes a sequence of future switching states for the semiconductor switches of the electrical converter; and
selecting the first switching state of the optimal switching sequence as a next switching state (u) to be applied to the semiconductor switches of the electrical converter,
wherein the optimal switching sequence is iteratively determined by:
extending a switching sequence by appending a possible switching state to the switching sequence;
determining a cost value for the extended switching sequence with a cost function based on the sequence of future electrical quantities, the cost function being based on a norm of a matrix equation with a triangular matrix, which is multiplied with the extended switching sequence, and the cost function is based on a difference between an unconstrained solution and the triangular matrix multiplied with the extended switching sequence, the unconstrained solution being determined from the future electrical quantities before iteratively determining an optimal switching sequence; and
discarding the extended switching sequence, when the cost value is higher than the maximal cost value; and
an electrical load supplied by the electrical converter.

2. The method of claim 1, wherein the triangular matrix is computed offline and depending only on the topology of the electrical converter.

3. The method of claim 1, wherein the maximal cost value is determined with the cost function applied to a guessed switching sequence based on an optimal switching sequence determined at a previous time step.

4. The method of claim 1, wherein, for extending a switching sequence, only switching states are appended that result in extended switching sequences in which a phase voltage is switched only by one step up or down.

5. The method of claim 1, wherein: the iteration is executed at each time step; the sequence of future electrical quantities starts at an actual time step and is determined up to a horizon of time steps; and the sequence of future switching states starts at the actual time step and is determined up to the horizon of time steps.

6. The method of claim 1, wherein the reference and/or actual electrical quantity includes at least one of reference and/or actual current, a reference and/or actual flux, a reference and/or an actual voltage, a reference and/or an actual torque, a reference and/or an actual power, and a reference and/or actual speed.

7. The method of claim 1, wherein a future electrical quantity includes at least one of a future current, a future voltage, and a future flux of an electrical machine, a filter, transformer, load, grid and/or a cable connected to the electrical converter.

* * * * *